UNITED STATES PATENT OFFICE.

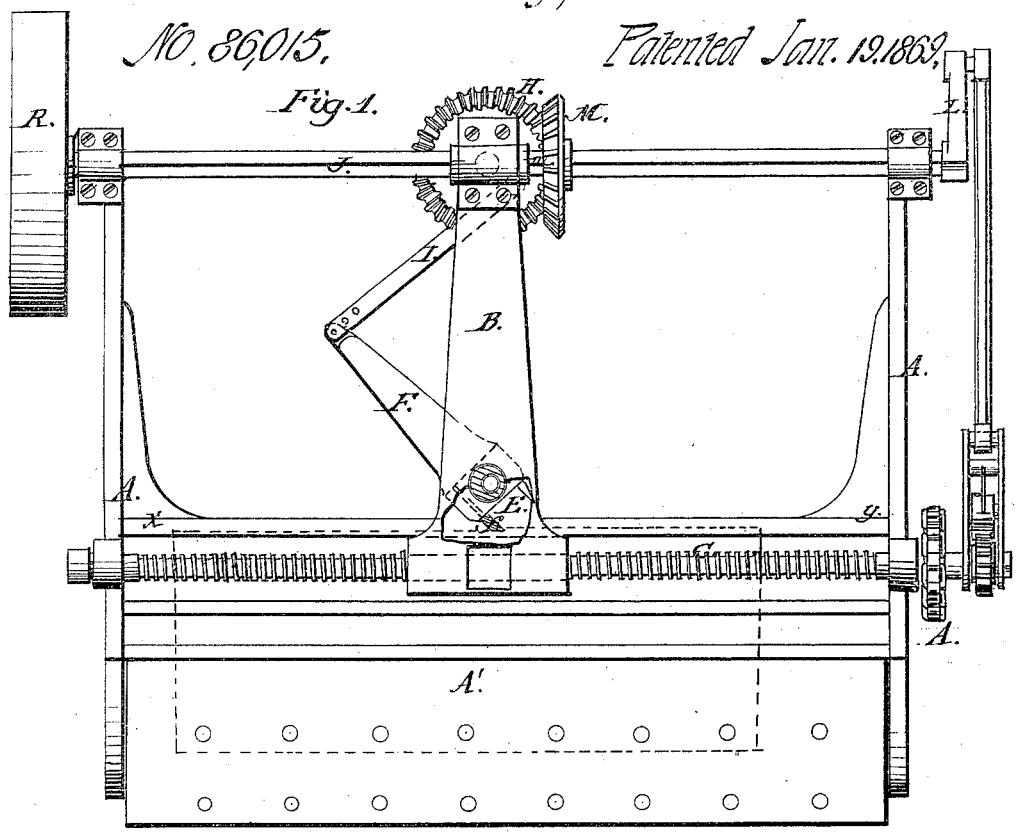
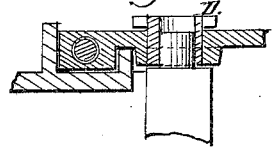
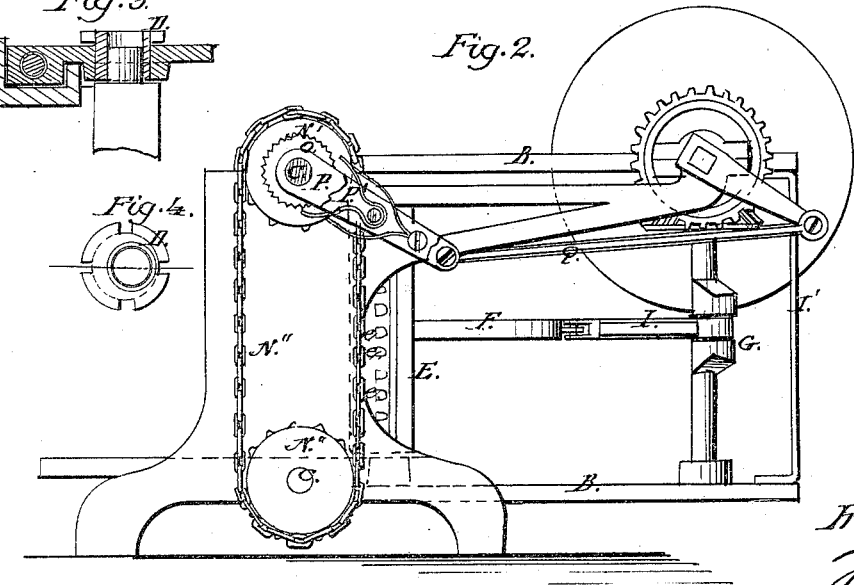

JOSEPH ELLICOTT HOLMES, OF NEW YORK, N. Y.

IMPROVED MACHINE FOR DRESSING AND SHAPING STONE.

Specification forming part of Letters Patent No. 86,015, dated January 19, 1869.

*To all whom it may concern:*

Be it known that I, JOSEPH ELLICOTT HOLMES, of New York, in the county of New York and State of New York, have invented a new and useful Improvement in Machinery for Dressing and Shaping Stone; and I do hereby declare that the following is a full, clear, and exact description thereof, which will enable others skilled in the art to make and use the same, reference being had to the accompanying drawings, forming part of this specification.

The machine or machinery which constitutes this invention, and which is intended as a substitute for hand-labor, in whole or in part, in cutting, dressing, or shaping stone, is formed and constructed as shown by the accompanying drawings, (to which the following explanation applies,) and operates in the manner hereinafter described.

Figure 1 is a horizontal view or plan of the machine, taken over all. Fig. 2 is an end elevation of the said machine. Figs. 4 and 5 show certain of the details enlarged and detached.

Similar letters of reference indicate like parts.

A represents the main frame; A', the bed-plate or table, upon which the blocks of stone to be dressed are placed, adjusted, and secured, as required; B B, traveling arms, in which the cutter-stock or cross-head (fitted with punches, or picks, or chisels) is mounted, and which arms and cutters are made to traverse the main frame A A from end to end alternately, or from left to right, and vice versa, by the screws C C'; D D, eccentric-bearings or plummer-blocks, in which the ends or journals of the cutter-stock or cross-head are centered. These eccentrics or bearings may be turned by a lever or a screw and worm, (not shown in the drawings,) and be fixed in position by stop-bolt. E, the cutter-stock or cross-head, in which the picks, chisels, or tools are fixed. *e e e*, &c., are the picks and punches, and *f*, the broad blade or finishing-tool or dresser; F, a lever, fixed to the stock or cross-head, for giving right and left hand cutting-motion to the chisels or tools, as the case may be; G, a cranked shaft, arranged in the outer ends of the traveling arms B B, and turned by the miter-wheel H; I, a connecting-rod between the crank G and the lever F, the respective positions of which can be changed at will for cutting in either direction; J, the main shaft, having a driving-pulley, K, fastened or keyed thereon at one end, and a slotted crank, L, at the other end; M, a second miter-wheel, mounted upon a hollow shaft, *m*, which turns on a bearing provided thereon at the outer end of one of the traveling arms B.

The main shaft J has a groove the length of it, to receive a tongue or feather in the hollow shaft *m*, which is turned by and traverses the main shaft as arms B B are moved backward or forward by the screws C C; or the shaft may be made square, and the groove and feather dispensed with. The outer ends of the arms B B are connected by the tie-bar T'.

N N' are chain-wheels, keyed into the ends of the screws C C, and connected by the chain N". O is a ratchet-wheel, which may either form an integral part of the chain-wheel N, or be applied to an elongation of the corresponding screw-shaft; P, a lever, centered upon the screw-shaft and ratchet-wheel O, and fitted with a double or reversing pawl, P', adjustable for turning the screws C C from left to right, and vice versa, according to the direction in which it is desired to work the cutters; Q, a connecting-rod, for giving a rocking motion to the lever P by the revolution of the slotted crank L on the end of the main shaft.

The crank-pin and connecting-rod may be so arranged that by varying the position of the crank-pin relatively to the connecting-rod the lever P can be made to turn the screws C C more or less at each revolution of the main shaft J, and thus regulate the feed.

Clamps, screws, and cross-bars may be arranged in connection with the bed-plate, by which the stone is secured in position while being dressed.

When operating this machine, the stone (quarried and rough-shapen) is placed upon the table or bed-plate A', with the side to be dressed toward the cutters, and held in position by the clamps, the clamping-screws, struts, and wedges or hand-screws, abutting against the ends of the frame, the cutters having previously moved to the end X or Y, as the case may be, and the cutter head or stock, with the pointed or narrow chisels or punches *e*, set to the required angle by attaching the lever F to the connecting-rod I, the chisel or punches

*e* also being adjusted for the proper depth of cut.

The power is applied through the pulley or the shaft J, and the required motion will be given to the whole moving parts of the machine.

Now, if the surface of the block is tolerably quarry-faced, one cut of the narrow chisels or punches *e*, as the cutter-arms traverse the frame from Y to X, will suffice to reduce the face of the stone operated upon to a nearly true and even plane, when, by taking out the draw-pin *g* and reversing the position of the cutter-stock to the opposite side of the crank-shaft, and thus bringing the broad chisel *f* to the working position, and by changing the pawl, thus causing the outer arms to traverse the reverse way, or from X toward Y, the surface of the stone will be regularly and evenly finished, and thus, by turning the blocks, the beds, faces, and joints may all be shaped with truth and rapidity.

In the machine shown upon the drawing, the bed-plate A' and the cutter-stock E are at right angles to each other, and therefore produce rectangular surfaces.

It will be obvious that by inclining the bed-plate or table more or less, any required angle may be given to the surface, and when once set, any number of blocks cut thereon will be perfectly uniform, one with another, while the use of the square, bevels, templets, and the like, may be dispensed with, and the time required for setting out and working marginal drafts, &c., as when dressed by hand labor is saved altogether.

The machine can be fitted with changing stocks for working concave or convex surfaces; and by giving a rising and falling motion to the bed-plate, spiral as well as plain and curved surface can be wrought thereby.

In cases where, from the irregularity of the quarrying or the nature of the finished work required, it is necessary to give a second or third cut with the narrow chisels, the tools are made reversible, so that the punches or narrow chisels can be used on either side, at will.

When fixing the position of the tools, the angle of the cut should be nearly, but not quite, in the line of the face of the dressed stone, and the feed of the screws should be such as to correspond with the cut of the tools, and the screws should be set to give motion to the traveling arms B B at the time the cutters are receding from the stone in the backward stroke. This is exceedingly important, as it relieves the screws from motion, and consequent friction under great pressure.

Those operating the machine should always reverse the latch or pawl when the lever operating the cutter-head is reversed, and never allow the traveling arms B B to be forced against the ends of the frame, or damage of some kind would invariably result.

The main frame may be provided with a swinging crane, for facilitating the operations of moving and turning the blocks of stone to and from and on the plate or table.

I propose to employ steel cutters, adapted to be inserted in suitable sockets in the cutter-head, or case-hardened tools; or they may be made of cast-iron, and chilled; and in case of the employment of chilled tools, the points *e* may be cast together in sections of six, more or less, and the cutter-heads cast with corresponding sockets, for the insertion of them, and the continuous cutter *f* may be cast in one piece.

I do not desire to limit myself to the precise arrangement of mechanism herein represented for operating my improved arrangement of the cutter-head, which may obviously be operated by other arrangements.

Having thus described my invention, I claim as new and desire to secure by Letters Patent—

1. The combination, in a stone-dressing machine, of a sliding and vibrating cutter-head, provided with two sets of tools, *e* and *f*, and arranged to be adjusted for the employment of either set, and a bed whereon the stone is held up to the tool, either fixed or capable of adjustment relatively to the said cutter-head, substantially as and for the purpose described.

2. The cutter-head E, arranged to be adjusted toward or from the stone to be acted on, substantially as and for the purpose described.

3. The combination, with the bed A, of the sliding arms B, screws C, shaft J, wheels H and M, and crank-shaft G, constructed and arranged substantially as and for the purpose specified.

4. The arrangement of the crank-shaft G, connecting-rod I, and arm F of the cutter-head, substantially as and for the purpose specified.

5. The combination and arrangement of the crank L, connecting-rod O and P, double spring-pawl P' and ratchet-wheel O, chain-wheel N N', chain N'', and screws C, all substantially as and for the purpose specified.

The above specification of my invention signed by me this 17th day of September, 1868.

JOSEPH ELLICOTT HOLMES.

Witnesses:
BRYAN JOHNSON,
OWEN HARRISON.